United States Patent [19]

Garg et al.

[11] Patent Number: 4,848,706
[45] Date of Patent: Jul. 18, 1989

[54] SPACECRAFT ATTITUDE CONTROL USING COUPLED THRUSTERS

[75] Inventors: Subhash C. Garg; Mahabaleshwar K. P. Bhat, both of San Jose, Calif.

[73] Assignee: Ford Aerospace Corporation, Newport Beach, Calif.

[21] Appl. No.: 161,931

[22] Filed: Feb. 29, 1988

[51] Int. Cl.[4] .............................................. B64G 1/26
[52] U.S. Cl. ...................................... 244/169; 364/459
[58] Field of Search ................ 244/164, 165, 166, 169, 244/170, 171, 322, 177; 364/459, 434

[56] References Cited

U.S. PATENT DOCUMENTS

| | | | |
|---|---|---|---|
| 3,643,897 | 2/1972 | Johnson, Jr. | 244/169 |
| 3,866,025 | 2/1975 | Cavanagh | 244/169 |
| 3,907,226 | 9/1975 | Neufeld et al. | 244/169 |
| 4,288,051 | 9/1981 | Göschel | 244/164 |
| 4,407,469 | 10/1983 | Fox | 244/169 |
| 4,537,375 | 8/1985 | Chan | 244/171 |
| 4,611,863 | 9/1986 | Iseley | 244/177 |
| 4,630,790 | 12/1986 | Williams, Jr. | 244/169 |

Primary Examiner—Galen Barefoot
Attorney, Agent, or Firm—Edward J. Radlo; Keith L. Zerschling

[57] ABSTRACT

An attitude control system for a three-axis controlled spacecraft (1) in which the location of thrusters causes significant cross-coupling torques. A thruster command conditioning electronics module (TCCEM) (3) is positioned between the conventional roll, pitch, and yaw loop controllers (41-43) and the thrusters (61-63). The TCCEM (3) converts spacecraft-axis-based torque requirement signals (TDX, TDY, TDZ) emanating from the loop controllers (41-43) into scalar quantities (UL, UM, UN) that are input to thruster modulators (51-53) that turn on one or more thrusters of the thruster pairs (L,M,N). The TCCEM (3) causes the spacecraft (1) attitude to be adjusted as commanded by the torque requirement signals (TDX, TDY TDZ) despite the presence of the cross-coupling. Two embodiments are illustrated: a working embodiment in which cross-coupling torques are produced about two axes (Y,Z), and a more general embodiment in which cross-coupling torques are present about all three axes (X,Y,Z).

10 Claims, 2 Drawing Sheets

SPACECRAFT ATTITUDE CONTROL USING COUPLED THRUSTERS

TECHNICAL FIELD

This invention pertains to the field of controlling the attitude of a three-axis controlled spacecraft by using thrusters, at least two of which produce torques about more than one spacecraft axis.

BACKGROUND ART

U.S. Pat. No. 3,907,226 discloses a system for position and attitude control of spin stabilized satellites. No cross-axis coupling of thrusters is shown. On the other hand, the present invention is used with three-axis controlled spacecraft, and at least two of the thrusters produce cross-axis coupling.

U.S. Pat. No. 4,288,051 discloses a system of attitude control for a three-axis stabilized satellite for both transfer orbit and synchronous orbit using a minimal number of thrusters. The reference does not suggest the present invention's thruster command conditioning electronics module (TCCEM 3) interposed between loop controllers and thruster modulators. Also, the reference deals only with uncoupled thruster pairs.

U.S. Pat. No. 4,630,790 discloses a technique for controlling the velocity and attitude of spinning projectiles using a minimal number of thrusters. It does not pertain to the three-axis stabilized spacecraft of the present invention.

DISCLOSURE OF INVENTION

The invention is used in conjunction with a three axis stabilized spacecraft (1) having at least three pairs of thrusters (L,M,N). Each thruster produces a force along a thruster axis which is shown by arrows in FIGS. 1 and 3. The thrusters control the spacecraft (1) attitude with respect to three orthogonal spacecraft axes (X,Y,Z). At least some degree of thruster cross-coupling is present. By this is meant that at least one pair of thrusters produces torque components about more than one spacecraft axis (X,Y,Z).

A block diagram of the invention is shown in FIGS. 2 and 4. Control means (41,42,43) generate torque requirement signals (TDX, TDY, TDZ) specifying the amount of torque required to adjust the attitude of the spacecraft (1) about each of the three spacecraft axes (X,Y,Z). A thruster command conditioning electronics module (3) is interposed between the control means (41,42,43) and the thruster pairs (L,M,N) for converting the torque requirement signals (TDX, TDY, TDZ) into thruster actuating signals (UL, UM, UN), which, being scalers, are represented in terms of the thruster axes. The thruster command conditioning electronics module (3) takes into account the magnitude and the direction of the cross-coupling, so that the spacecraft (1) attitude is adjusted in a manner directed by the torque requirement signals (TDX, TDY, TDZ) despite the presence of the cross-coupling.

BRIEF DESCRIPTION OF THE DRAWINGS

These and other more detailed and specific objects and features of the present invention are more fully disclosed in the following specification, reference being had to the accompanying drawings, in which.

BEST MODE FOR CARRYING OUT THE INVENTION

Figure 1:
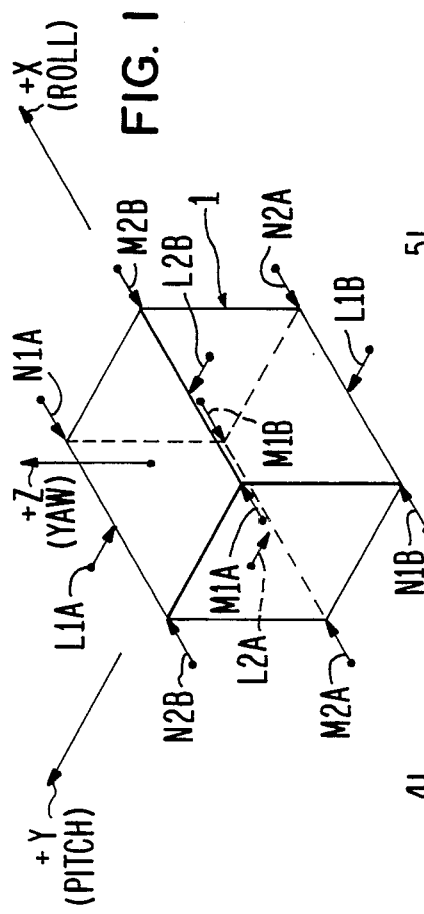
FIG. 1 is an isometric sketch of a spacecraft 1 showing the position of thrusters in a special case embodiment of the present invention.

On many three-axis controlled spacecraft, thruster pairs are used to provide torques for attitude control. At least some of the thrusters might generally be positioned and oriented so that their firing produces a torque about the spacecraft center of mass, which torque has components along more than one of the three orthogonal spacecraft axes (roll (X), pitch (Y), yaw (Z)). This might be due to structural or geometrical constraints imposed by the overall design of the particular spacecraft. In general, torque components are determined by thruster location, orientation of thrust vector, thrust level, and location of the spacecraft center of mass. Torque components can be calculated readily from the above information. If such components arise along more than one axis, thruster cross-coupling is said to be present. Such cross-coupling may be beneficial to the design or may be unwanted.

If the cross-coupling magnitude is not too great, the attitude control system is capable of handling the cross-coupling torques within its normal deadband operation, although it may have been designed for no cross-coupling. Any motion of the spacecraft, other than intended motion, is compensated for automatically. However, this automatic compensation wastes time, and wastes fuel. Furthermore, if the degree of cross-coupling is too large, it can and will make the attitude control system unstable, and therefore practically useless.

What is needed, therefore, is what is offered by the present invention, is a system whereby cross-coupling torques produced by thruster offsets are automatically compensated for, and the spacecraft is made to move in the direction intended by the normal control loops despite the presence of the cross-coupling.

A major advantage of this invention is that no additional expensive thrusters are required, beyond the minimum required for normal attitude control. Another major advantage of the invention is that it allows greater freedom to the spacecraft designer in selecting the location of the thrusters.

In the Figures, the arrows (vectors) representing the thrusters show the direction of force produced by the thrusters. Thus, each such vector is aligned with an axis called the "thruster axis" or the "thruster line-of-force axis".

In spacecraft 1 incorporating the present invention, at least three pairs of thrusters L,M,N are used to control spacecraft 1 about the spacecraft axes X,Y,Z. Within each thruster pair, the numeral 1 indicates a positive direction of torque about a certain spacecraft axis, and the numeral 2 designates a negative direction of torque about a certain spacecraft axis. Thus, for example, thrusters L1 and L2 constitute a thruster pair. Thruster L1 produces a positive torque about a given axis (the roll axis in FIG. 1) and thruster L2 produces a negative torque about this same axis.

The invention can work equally well with a redundant or a non-redundant thruster system. In a non-redundant system, only three pairs of thrusters are used. In a redundant system, six or more pairs of thrusters are used. In the redundant system illustrated in FIGS. 1 and 3, the thrusters are arranged into two strings, strings A and B. Thus, for example, there are two pairs of L thrusters: L1A, L2A constitute a first pair, and L1B, L2B constitute a second pair. In the shorthand notation used in this specification, "pair L,M,N" can refer to several of each of L, M, and N pairs if there are several strings.

If all the thrusters within a string should fail, for example due to a clogged fuel line, the thrusters from the other string can be pressed into service without impairing the maneuverability of spacecraft 1.

It is assumed that thrusters within each pair L,M,N produce torques of similar magnitude but opposite direction (sign).

Figure 2:
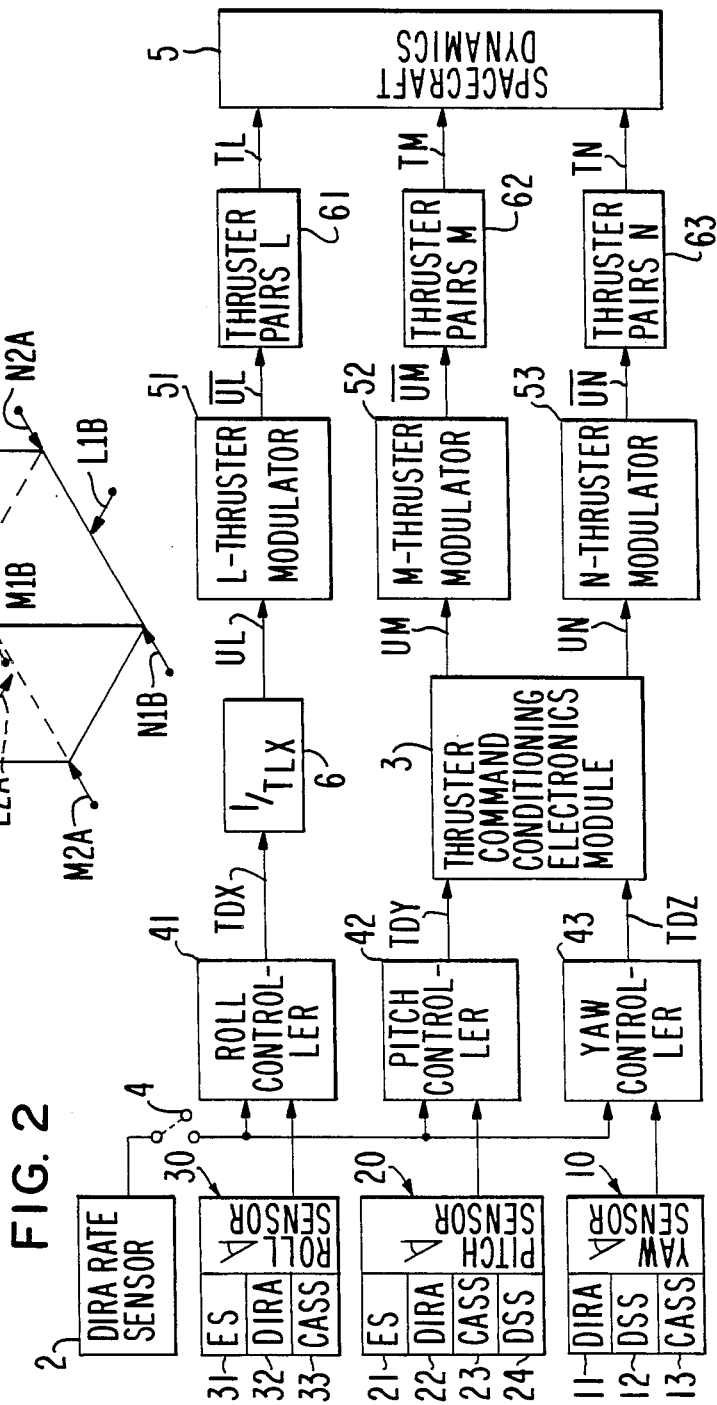
FIG. 2 is a block diagram of the embodiment of the present invention corresponding to FIG. 1.

The invention will first be illustrated, via FIGS. 1 and 2 and accompanying description, with respect to a working embodiment in which spacecraft 1 is the SCS-1 satellite built by Ford Aerospace Corporation for Space Communications Corporation of Japan. In this satellite 1, the L pair of thrusters produce predominantly a roll torque. Small cross-axis torques also exist, but their presence need not be taken into account for designing the roll attitude control loop.

The M and N thrusters, on the other hand, are designed to produce substantial torques about each of the pitch and yaw axes. This is illustrated in the following Table 1, which shows the signs of the torques produced by the L,M and N thrusters, but does not give their magnitudes.

TABLE 1

| THRUSTER | TORQUE SIGNS | | |
|---|---|---|---|
| | X(ROLL) | Y(PITCH) | Z(YAW) |
| L1A | + | Negligible | Negligible |
| L1B | + | " | " |
| L2A | − | " | " |
| L2B | − | " | " |
| M1A | Negligible | + | + |
| M1B | " | + | + |
| M2A | " | − | − |
| M2B | " | − | − |
| N1A | " | − | + |
| N1B | " | − | + |
| N2A | " | + | − |
| N2B | " | + | − |

This coupling of the N,M thruster pairs is intentional, and is controlled by the satellite 1 design. All A and B thrusters are mutually redundant.

Figure 3:
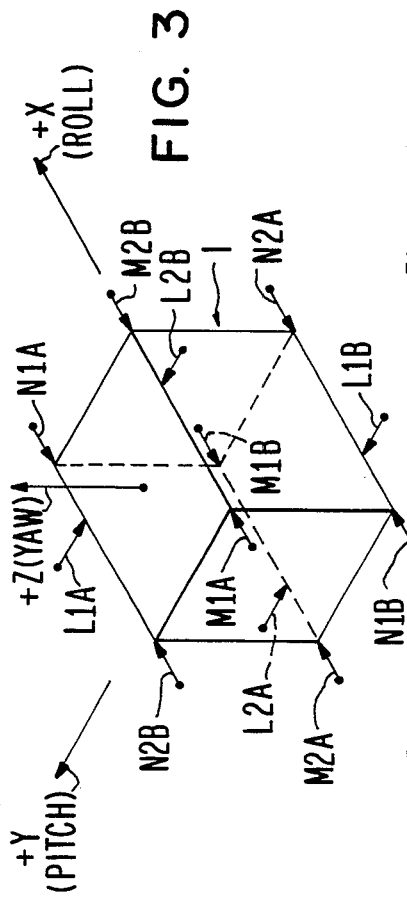
FIG. 3 is an isometric sketch of a spacecraft 1 showing the position of thrusters in an embodiment of the present invention that is more general than that of FIGS. 1 and 2.

In order for the invention to work, the thrusters do not have to be parallel to the spacecraft axes X,Y,Z as implied by FIGS. 1 and 3. The thrusters can be canted, and are in fact canted in the illustrated SCS-1 embodiments. Canting of thrust vectors with respect to the spacecraft axes X,Y,Z is a possible means to create cross-coupling and can also be used to reduce control torques to a desired level. The presence or absence of thruster canting has no effect on the present invention.

Turning now to FIG. 2, roll, pitch, and yaw controllers 41,42,43, respectively, set the loop control gains and compensation for spacecraft axes X,Y,Z respectively. Controllers 41,42,43 (which produce torque requirement signals TDX, TDY, TDZ, respectively), can be designed as usual, that is, as if no cross-coupling were present. Signals TDX, TDY, TDZ are proportional to the amount of designed torque about the three axes X,Y,Z, respectively. Controllers 41,42,43 require roll, pitch, and yaw angle information, which they receive from sensors 30, 20, and 10, respectively. Sensors 30,20,10 can be any sensors that provide this information. For example, roll sensor 30 may be some combination of an earth sensor 31, a DIRA (digital integrating rate assembly) 32, or a CASS (coarse analog sun sensor) 33. These individual components are used depending upon the location of satellite 1 in its orbit. The sensors need not provide pure roll, pitch, or yaw information; that is, sensor outputs may also be coupled, without affecting the utility of the present invention.

Similarly, pitch sensor 20 may be some combination of earth sensor 21, DIRA 22, CASS 23, and DSS (digital sun sensor) 24.

Similarly, yaw sensor 10 may be some combination of DIRA 11, DSS 12, and CASS 13.

In addition, controllers 41,42,43 may require angular rate information for the three axes X,Y,Z. This information is provided via optional switch 4 from, for example, DIRA rate sensor 2.

For the special case illustrated in FIGS. 1 and 2, the roll commands are pure, and the thruster pair L produces substantially pure roll torque. Therefore, signal TDX does not have to be processed by thruster command conditioning electronics module (TCCEM) 3. However, TDX is multiplied by the scaling factor 1/TLX by means of multiplier 6. TLX is the known torque produced by one of the L thrusters about the X axis.

Associated with each thruster pair L,M,N is a modulator 51,52,53, respectively, for controlling the firing of the associated thrusters. Each modulator 51–53 may be, e.g., a pulse-width, pulse-frequency (PWPF) modulator. In the case where redundant strings A,B are employed, such as in FIGS. 1 and 3, each modulator 51–53 may control two pairs of thrusters, a pair from the A string and a pair from the B string. This is the embodiment illustrated in FIGS. 2 and 4. Alternatively and preferably, each pair of thrusters from each string may have associated therewith a separate thruster modulator (51–53), and each modulator (51–53) have associated therewith a separate controller (41–43).

The scaler control signals fed to thruster modulators 51–53 are denominated UL, UM, and UN, respectively. Horizontal bars are placed above these quantities as they exit the modulators 51–53 in FIGS. 2 and 4, to indicate modulated versions of these signals. The torques produced by the thruster pairs are vector quantities, and are denoted by vectors TL, TM, and TN, respectively. These torque vectors may have components about more than one spacecraft axis. The components of torque are denominated as TLX, TLY, TLZ for the three components of TL torque; TMX, TMY, TMZ for the three components of TM torque; and TNX, TNY, TNZ for the three components of TN torque. The spacecraft torques influence the spacecraft dynamics 5 and hence the repositioning of the attitude of spacecraft 1.

In the embodiment illustrated in FIG. 2 the following relationships are imposed at any instant in time:

TDX=(TLX)(UL)

TDY=(TMY)(UM)+(TNY)(UN)

$$TDZ = (TMZ)(UM) + (TNZ)(UN)$$

The above formulas are used to calculate the inputs to the thruster modulators 51,52,53. The bottom two equations are processed by TCCEM 3 to produce the control signals UM,UN based on the requirement signals TDY, TDZ.

If the torque component TMY is roughly equal to minus TMZ ($-$TMZ), and if the torque component TNY is roughly equal to TNZ (i.e., +TNZ), then we may say that thrusters M and N are "balanced" with respect to each of the two coupled axes Y,Z and provide roughly orthogonal torque vectors. When thrusters M and N are so balanced and orthogonal, it follows from the above set of equations that UM is roughly equal to $-(TDY-TDZ)/2TMZ$, and UN is roughly equal to $(TDY+TDZ)/2TNZ$. Thus, these difference and sum equations are programmed into TCCEM 3, and TCCEM 3 will output the UM and UN that will accomplish the desired objective. This simple case has been used on SCS-1, but does in no way limit the use of the invention.

The control signals UL, UM, UN may be negative as well as positive. The corresponding modulators 51–53 have been programmed to select that thruster from the thruster pair that has the sign required to effectuate the desired motion, based upon the sign of the incoming UL, UM, or UN.

Figure 4:
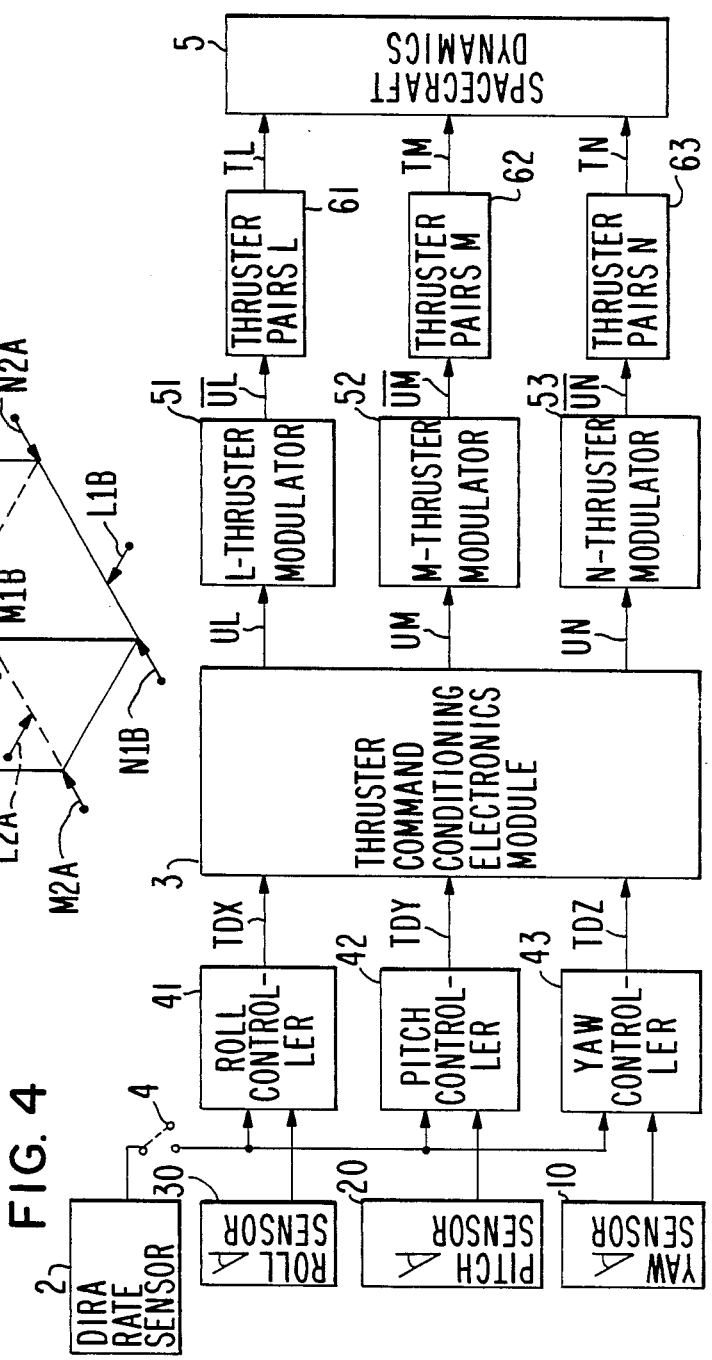
FIG. 4 is a block diagram of the embodiment of the present invention corresponding to FIG. 3.

A more general embodiment of the invention is illustrated in FIGS. 3 and 4. FIG. 3 shows the M and N thrusters positioned as in FIG. 1, but the L thrusters also produce cross-axis torques. For this reason, this embodiment requires that all three of the torque requirement signals TDX, TDY, TDZ be processed by TCCEM 3, as illustrated in FIG. 4. Otherwise, the positioning of the hardware elements is the same in FIG. 4 as it is in FIG. 2.

The equations governing the operation of TCCEM 3 for this general embodiment can be written as follows:

$$TDX = (TLX)(UL) + (TMX)(UM) + (TNX)(UN)$$

$$TDY = (TLY)(UL) + (TMY)(UM) + (TNY)(UN)$$

$$TDZ = (TLZ)(UL) + (TMZ)(UM) + (TNZ)(UN)$$

This is a set of three simultaneous equations in three unknowns. The unknowns are UL, UM, and UN. The requirement signals TDX, TDY, TDZ are known. The nine components of torque produced by the thrusters are known, from the position of the center of mass of spacecraft 1, the amount of force produced by each thruster, and the location and orientation of the line-of-force vector associated with each thruster.

The three simultaneous equations are solved by any well-known mathematical technique. Alternatively, approximate solutions may be obtained using electronic means. TCCEM 3 is designed so as to produce the resulting UL, UM, UN from the values of TDX, TDY, TDZ that are input into TCCEM 3 by controllers 41–43.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A three-axis stabilized spacecraft having at least three pairs of thrusters, each thruster producing force along a thruster axis, for controlling the spacecraft attitude with respect to three orthogonal spacecraft axes, wherein:

at least some cross-coupling torque is produced by the thrusters, i.e., at least one pair of thrusters produces torque components about more than one spacecraft axis; said spacecraft further comprising:

control means for generating torque requirement signals which are represented in terms of the spacecraft axes, said torque requirement signals specifying the amount of torque required to adjust the attitude of the spacecraft about each of the three spacecraft axes; and thruster command conditioning means interposed between the control means and the thruster pairs for converting the torque requirement signals into thruster actuating signals which are represented in terms of the thruster axes, said conditioning means taking the magnitude and direction of the cross-coupling into account, so that the spacecraft attitude is adjusted in a manner directed by the torque requirement signals despite the presence of the cross-coupling.

2. The spacecraft of claim 1 wherein:
    the two thrusters comprising each pair of thrusters produce roughly equal magnitude and opposite direction of torque about one of the spacecraft axes.

3. The spacecraft of claim 1 further comprising a thruster modulator associated with each pair of thrusters; wherein
    the thruster actuating signals are fed to the thruster modulators.

4. The spacecraft of claim 3 wherein each thruster modulator activates just one of the two thrusters from its associated thruster pair, depending upon the sign of the thruster actuating signal that is fed to said thruster modulator.

5. The spacecraft of claim 1 wherein the thrusters are arranged into first and second thruster strings each comprising three pairs of thrusters, and each of said strings is independently capable of repositioning the spacecraft with respect to the three spacecraft axes.

6. The spacecraft of claim 1 wherein a first pair of thrusters does not produce cross-coupling torques;
    second and third pairs of thrusters each produce cross-coupling torques about each of two spacecraft axes denominated as coupled axes;
    the control means produces three torque requirement signals corresponding to the three spacecraft axes, respectively;
    the torque requirement signal corresponding to the spacecraft axis other than one of the two coupled axes is not changed by the conditioning means; and
    the torque requirement signals corresponding to the two coupled axes are changed by the conditioning means.

7. The spacecraft of claim 6 wherein:
    the conditioning means produces first and second thruster actuating signals that are derived by solving a set of two simultaneous linear algebraic equations; and the first and second thruster actuating signals are fed to thruster modulators associated with the two pairs of thrusters that produce cross-coupling torques, respectively.

8. The spacecraft of claim 6 wherein:

the thrusters that produce axis cross-coupling torques produce roughly equal magnitudes of torque about each of the two coupled axes;

the conditioning means produces a first thruster actuating signal that is proportional to the sum of the torque requirement signals corresponding to the two coupled axes; and the conditioning means produces a second thruster actuating signal that is proportional to the difference of the torque requirement signals corresponding to the two coupled axes; wherein the first and second thruster actuating signals are fed to thruster modulators associated with the two pairs of thrusters that produce cross-coupling torques, respectively.

9. The spacecraft of claim 1 wherein:

each thruster pair produces torque about more than one spacecraft axis;

the control means produces three torque requirement signals corresponding to the three spacecraft axes, respectively, each of said torque requirement signals being fed to and altered by the conditioning means;

each pair of thrusters has associated therewith a thruster modulator for selectively activating one of the two thrusters from the thruster pair; and the conditioning means produces three thruster activating signals that are respectively fed to the thruster modulators.

10. The spacecraft of claim 9 wherein the thruster activating signals are derived from the torque requirement signals by means of solving a set of three simultaneous linear equations having a plurality of knowns and three unknowns, wherein the unknowns are the thruster activating signals and the knowns are the torque requirement signals and the torques produced by the thrusters about each of the three spacecraft axes.

* * * * *